(No Model.)
H. R. STICKNEY.
APPARATUS FOR COOKING CORN, &c, IN CANS.
No. 531,479. Patented Dec. 25, 1894.
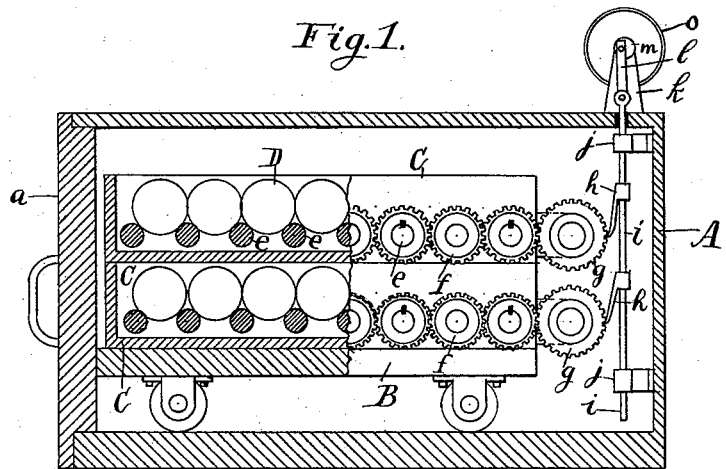
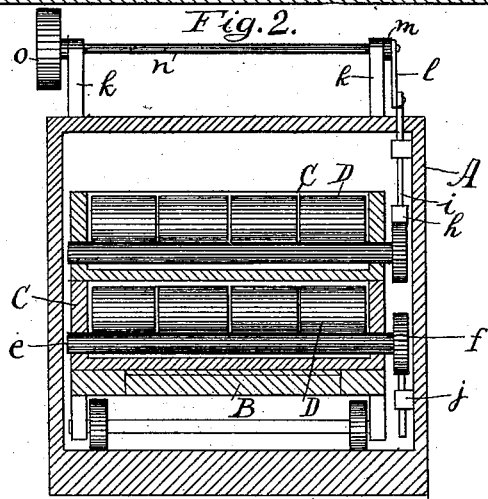
Witnesses:
James E. Harris.
E. Dudley Freeman.
Inventor:
Henry R. Stickney
by S. W. Bates
his atty.

UNITED STATES PATENT OFFICE.

HENRY R. STICKNEY, OF PORTLAND, MAINE.

APPARATUS FOR COOKING CORN, &c., IN CANS.

SPECIFICATION forming part of Letters Patent No. 531,479, dated December 25, 1894.

Application filed October 22, 1894. Serial No. 526,546. (No model.)

*To all whom it may concern:*

Be it known that I, HENRY R. STICKNEY, a citizen of the United States, residing at Portland, in the county of Cumberland and State of Maine, have invented certain new and useful Improvements in Apparatus for Cooking Corn or other Like Substances in Sealed Cans; and I do hereby declare the following to be a full, clear, and exact description of the invention, such as will enable others skilled in the art to which it appertains, to make and use the same.

My invention relates to the art of canning corn and other similar food products and the object of the invention is to construct an apparatus for rotating the cans while they are being steamed or cooked in the retort.

In the ordinary process of canning corn the corn is sealed in cans and placed in trays in a steam heated retort where it is cooked. According to the old method the cans were not moved after they were placed in the retort and the result was that the corn nearest the outside of the can was cooked harder than that in the middle so that the contents were not of a uniform character.

It has been found that if the corn can be stirred or kept in motion during the steaming process it cooks more evenly and in a shorter time.

My present invention as I have carried it out consists of one or more trays having a series of rollers journaled therein on which the cans rest on their sides the rollers being geared together outside the tray. Connected with the train of gears is a ratchet acted upon by a reciprocating pawl which slowly turns the gears and rotates the cans.

In the accompanying drawings I have illustrated an apparatus embodying my invention.

In the drawings Figure 1, is a central longitudinal section through the retort the sides of the trays being shown in the elevation, and Fig. 2. is a cross section on the line *x x* of Fig. 1.

A represents the retort which may be of any construction desired for steam cooking the corn and *a* thereof is the door. I prefer to introduce the trays by means of a truck B in the usual manner. The trays C are piled one on another on the truck B and each tray is provided with a series of rollers C' journaled side by side preferably a distance apart equal to the diameter of the cans. The cans D rest on their sides between these rollers. When the rollers are rotated the cans rotate with them. The rollers are turned by gears mounted on their outer ends and engaging each other to form a train of gears along the side of the tray. Every other gear is loose on the end of the roller so that only every other roller revolves. At the end of each tray engaging the train of gears is journaled a ratchet gear *g*. Motion is imparted to the ratchet gear *g* by means of the reciprocating pawl *h*.

The several pawls for turning the ratchet attached to the trays are located as here shown on an upright rod which is adapted to move longitudinally in bearings *j* secured to the side of the retort. The end of the rod *i* extends up through the top of the retort and is there connected with a pitman *c* the opposite end of which is connected with the crank disk M mounted on the end of the shaft N.

K K are the bearings for the shaft N and O is the driving pulley.

The retort is supplied with steam in the usual manner.

The operation of the device is obvious from its construction.

Power is applied to the driving pulley and the rod *i* and the pawls *h* are reciprocated slowly, rotating the ratchet gear *g* and the alternate rollers on which the cans rest. When the car B with the trays on it are run into the retort the ratchet gears *g* come automatically into engagement with the pawls *h* and begin at once to rotate.

Any number of trays may be placed on the truck B.

If desired each roller may be made to rotate by using intermediate gears.

I claim—

The herein described apparatus for cooking corn and other like substances in sealed cans, consisting of a retort, trays, adapted to fit therein, said trays having journaled therein a series of rollers on which the cans rest on their sides, a train of gears connecting the ends of said rollers a ratchet gear journaled at the end of each tray and engaging the said train of gears and a reciprocating pawl adapted to engage each of said ratchet gears.

In testimony whereof I affix my signature in presence of two witnesses.

HENRY R. STICKNEY.

Witnesses:
S. W. BATES,
E. DUDLEY TRUMAN.